United States Patent [19]
Birdwell

[11] Patent Number: 4,906,117
[45] Date of Patent: Mar. 6, 1990

[54] USER REMAPPABLE KEYBOARD

[75] Inventor: Gerry G. Birdwell, Richardson, Tex.

[73] Assignee: Texas Instruments Incorporated, Dallas, Tex.

[21] Appl. No.: 296,362

[22] Filed: Jan. 9, 1989

Related U.S. Application Data

[63] Continuation of Ser. No. 106,993, Oct. 5, 1987, abandoned, which is a continuation of Ser. No. 813,448, Dec. 26, 1985, abandoned.

[51] Int. Cl.$^4$ ................................................ B41J 5/12
[52] U.S. Cl. .................................... 400/490; 400/495; 400/472
[58] Field of Search ............... 400/472, 485, 489, 490, 400/495, 492, 679, 677, 678, 480, 481, 473, 474, 110

[56] References Cited

U.S. PATENT DOCUMENTS

| | | | |
|---|---|---|---|
| 4,119,839 | 10/1978 | Beckmann et al. | 400/473 X |
| 4,207,010 | 6/1980 | Wernsing | 400/474 X |
| 4,294,555 | 10/1981 | Galaske et al. | 400/495 X |
| 4,349,286 | 9/1982 | Blaser et al. | 400/495 X |
| 4,509,873 | 4/1985 | Ryan | 400/489 |

FOREIGN PATENT DOCUMENTS 2097336 11/1982 United Kingdom ................ 400/473

OTHER PUBLICATIONS

IBM Tech. Disc. Bulletin, "Changeable Keyboard Array", Cooper, vol. 11, No. 5, Oct. 1968, p. 524.
IBM Tech. Disc. Bulletin, "Keyboard with Changeable Encoding and Key Designation", Johnson, vol. 13, No. 7, Dec./1970, pp. 2041-2042.
IBM Tech. Disc. Bulletin, "Removable Keyboard Template", Reisner, vol. 21, No. 8, Jan. 1979, pp. 3329-3330.
IBM Tech. Disc. Bulletin, "Change or Rearrangement of a Keyboard", Adam et al., vol. 24, No. 8, Jan. 1982, p. 4129.
IBM Tech. Disc. Bulletin, "Adjustable Keyboard", Frank et al., vol. 27, No. 1A, Jun. 1984, pp. 153-154.
IBM Tech. Disc. Bulletin, "Dummy Key Implementation", Banker et al., vol. 15, No. 6, Nov. 1972, pp. 1930-1931.
IBM Tech. Disc. Bulletin, "Keybutton Removing Tool", Conrad, vol. 22, No. 5, Oct. 1979, p. 1793.
IBM Tech Disc. Bulletin, "Keytop Removal Tool", Batten, vol. 24, No. 8, Jan. 1982, pp. 4008-4009.
IBM Tech. Disc. Bulletin, "Multiple Keystroke Characters on Display Terminals", Motola et al., vol. 25, No. 12, May 1983, p. 6467.
IBM Tech. Disc. Bulletin, "Method to Provide PC Return Key with Two Fractions", vol. 28, No. 4, Sep. 1985, pp. 1504-1505.

Primary Examiner—Edgar S. Burr
Assistant Examiner—Joseph R. Keating
Attorney, Agent, or Firm—Melvin Sharp; James T. Comfort

[57] ABSTRACT

The disclosure relates to a reconfigurable keyboard which is customized by providing a curved baseplate carrying switches which are key actuated whereby all keys have substantially the same curvature and are interchangeable. The keyboard arrangement is substantially that of a standard typewriter with a plurality of spaces on either side of and over the standard typewriter keyboard in an x-y matrix arrangement. Each key position is provided with either a key cover which is utilized when the key position is not to be used or with a standard key cap which operates the switch at the key position associated therewith and which stands up higher than a key cover, the latter sitting at essentially the same level as the keyboard housing. A key can be of an enlarged type to span two or more key positions either on the same row or different rows. Each of the key locations is capable of providing an output signal which is determined by a software operation in a selective manner or by prearranged program. The present key arrangement of the keyboard can be displayed on a display and the key arrangement can be altered utilizing a different complete preselected keyboard arrangement which is provided in the software or, alternatively, each key position can be provided with a desired function on a key by key basis under software control. The function keys on the keyboard can then be removed from their respective switches and placed into other switches corresponding to the new layout of characters.

7 Claims, 4 Drawing Sheets

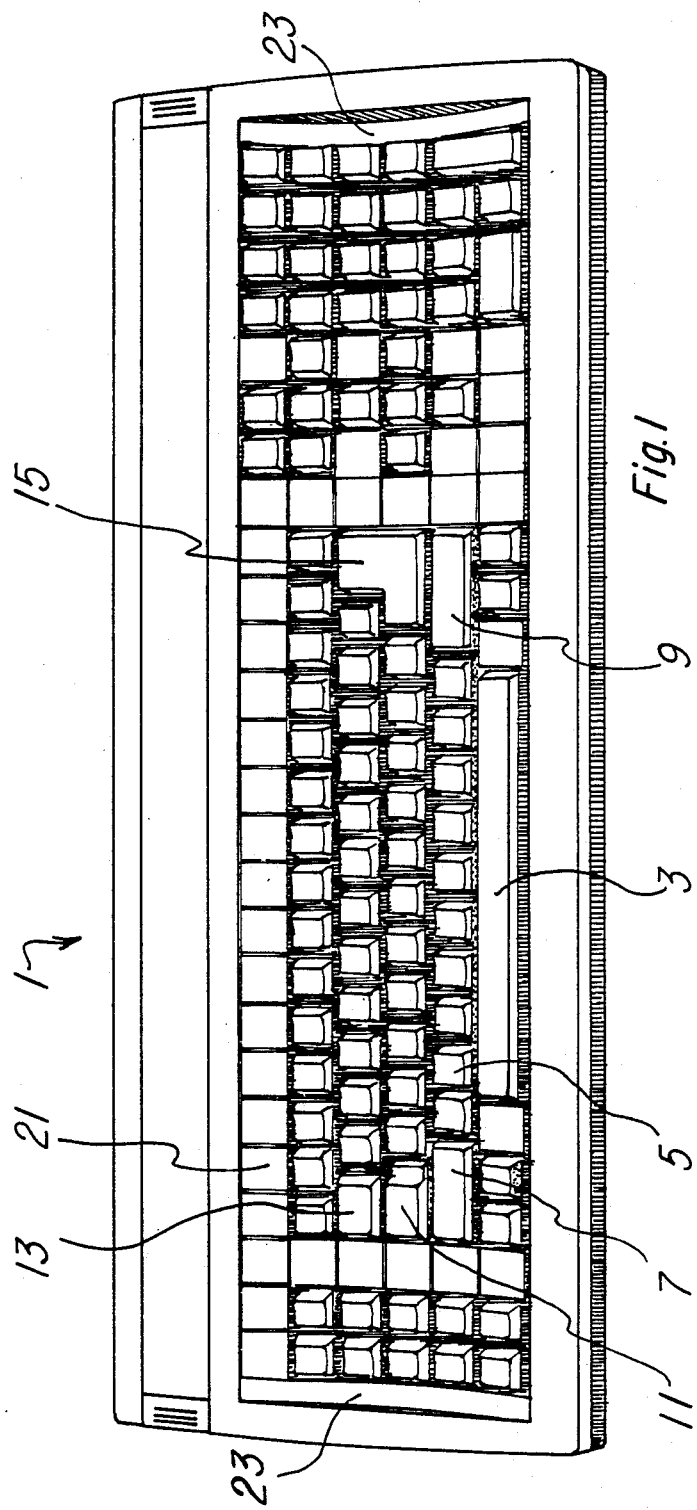

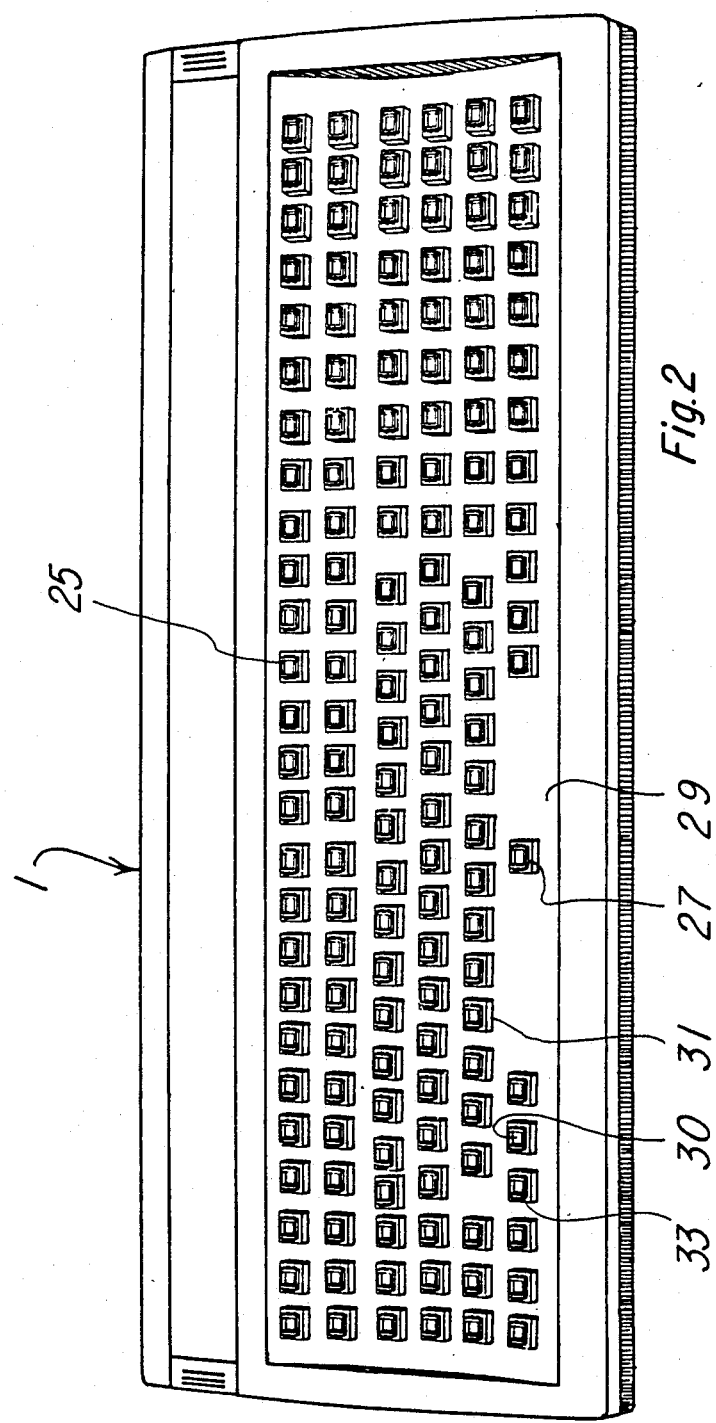

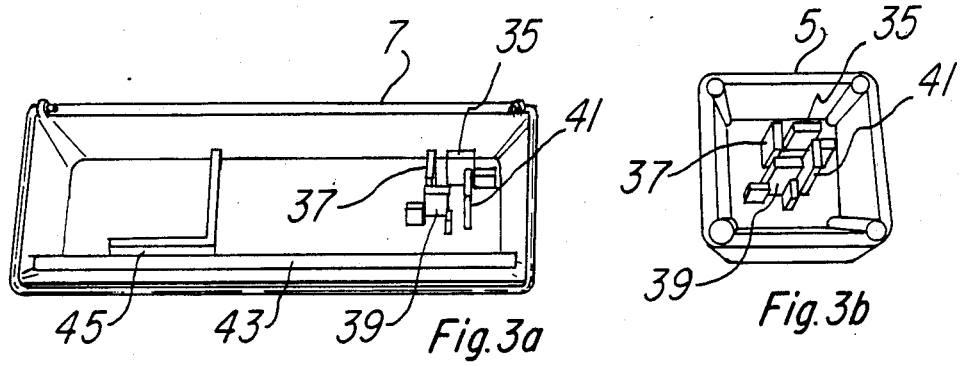
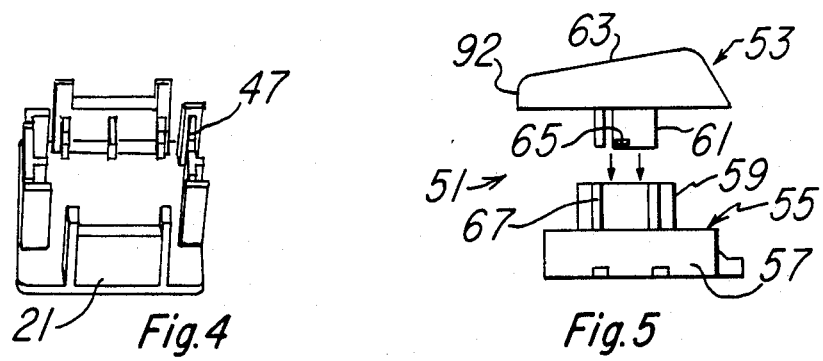
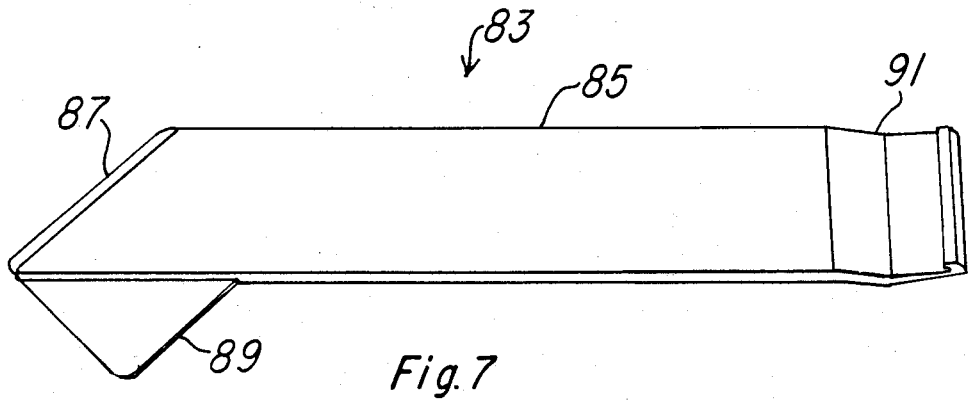

USER REMAPPABLE KEYBOARD

This application is a continuation of application Ser. No. 106,993, filed Oct. 5, 1987, now abandoned which is a continuation of Ser. No. 813,448 filed Dec. 26, 1985, now abandoned.

BACKGROUND OF THE INVENTION

This invention relates to keyboards for use in conjunction with computers or terminals and, more specifically, to a keyboard in which each potential key location can be selectively defined.

BRIEF DESCRIPTION OF THE PRIOR ART

Computer keyboards of the prior art have generally been designed with the key arrangement being that of an x-y matrix with all of the keys disposed in rows and colums which are parallel to each other or, alternatively, the keys of such keyboards have been arranged in the manner of a typewriter keyboard with certain of the keys being positioned in a somewhat curved configuration similar to the shape of the hand with the keys to the sides and above the normal typewriter configuration being positioned in an x-y matrix type configuration. This latter configuration has attained wider acceptance in the industry and is the type of keyboard arrangement which will be discussed hereinbelow.

Any computer keyboard layout is designed around some optimization of competing and sometimes mutually exclusive functions. These functions are the need and preference of users and resellers of such keyboards, human factors such as the frequency of use of the keys, danger of accidental keypress, etc., and the software application requirements. This problem is particularly vexing to manufacturers supplying equipment to many resellers since the best compromise solution may end up satisfying no one. It is presently possible to provide keyboards capable of remapping positions or keys to a desired or predetermined output code, however it is difficult to move the key caps with the legends thereon to follow new mapping and remind the user what to expect from each key press. A common problem which must be resolved is that "stepped sculptured" keyboards use differently shaped key caps for each row to approximate the true curved keyboard. The keys of such keyboards cannot be moved from one position to another and still retain a true curved keyboard shape. A second problem is that two high frequency keys that users have strong preferences for are typically oversized keys, such keys especially being the "return" and the "shift" key. Furthermore, such oversized keys often have different shapes on different keyboards. The problem of curvature in the keys has been overcome in the prior art by utilizing a truly curved keyboard. The truly curved keyboard permits keys of identical shape to be used in all key positions with the keyboard retaining its curved shape, even after interchange of keys. A further problem in the prior art, which is more difficult to accomodate, is that most of the differences in user preferences revolve around the following two points: (1) ISO/SEL "return" key - the european required ISO layout requires three keys between the "L" and the return key while the IBM selectric keyboard requires two keys between the "L" and an L-shaped "return key" and (2) the ISO/SEL left "shift" key - ISO users require a key which is typically a " " between the "Z" and the left "shift" key whereas IBM selectric type keyboards require the left "shift" key to be directly to the left of the oversize "Z" key. The above is further complicated by the DIN/TCA requirements for low profile keyboards which provide less adequate support for the smooth mechanical movement of oversized key caps. In view of the above problems, the prior art has been unable to provide a single keyboard which is capable of being utilized in connection with the major possible keyboard configurations, thereby requiring the user to learn to handle each different type of keyboard when changing from one type of instrument to a second type of instrument with a different keyboard arrangement.

SUMMARY OF THE INVENTION

In accordance with the present invention, the above noted problems of the prior art are minimized and there is provided a keyboard having a conventional layout for the normal or standard typewriter keyboard and which can be effectively customized to the needs and preferences of any reseller or user. Briefly, in accordance with the present invention, there is provided a curved keyboard as utilized in the prior art whereby all keys have substantially the same curvature and are thereby interchangeable while still retaining a true curved keyboard shape. The keyboard arrangement is substantially the same as the standard typewriter keyboard with a plurality of spaces on either side of the standard typewriter keyboard and thereabove provided with key locations in an x-y matrix arrangement. Each matrix position is provided with a switch which is key actuated. Each key position is provided with either a key cover which is utilized when the key position is not to be used with a standard key cap which operates the switch at the key position associated therewith and which stands up higher than a key cover, the key cover sitting at essentially the same level as the keyboard housing. A key cap can be of an enlarged type to span two or more key positions either on the same row or on different rows, activating only one key switch and preventing the other(s) from being operated. In this way, oversized keys of any desired shape can be utilized to provide the configuration of substantially any keyboard. Each of the key locations is capable of providing an output signal which is determined by a software operation in a selective manner or by prearranged program, as desired. It is therefore readily apparent that any key position can be provided with any desired function and that plural key positions can have the same function, thereby also permitting a key to span plural key positions and yet provide the desired function regardless of where the key is depressed. Furthermore, as is standard in the prior art, a torsion device will normally be utilized in conjunction with the oversized keys so that equal pressure is provided along the entire key cap surface, regardless of where the key is depressed. It is also readily apparent that those key positions which will not be used, in addition to being covered with a key cover, can also be provided with a program signal such that position will provide an inoperable or no key signal in the event that key position is scanned by a host computer.

In operation, software is provided whereby the present key arrangement of the keyboard can be displayed on a display and, if desired, the key arrangement can be altered utilizing a different complete preselected keyboard arrangement which is provided in the software or, alternatively, each key position can be associated with a desired function by a user/reseller on a key by key basis under software control. When each key position has been provided with its desired function as is displayed on the display, the function keys on the keyboard can be removed from their respective key positions and placed into other key positions corresponding to the layout of characters as shown on the display. It is readily apparent from the above description that the keyboard arrangement provided herein is of universal nature and can be programmed and reconfigured either by software or manually to provide any desired keyboard arrangement. It is also apparent that the same function can be selectively provided by plural key locations and that the keys themselves can be formed to span plural key positions.

BRIEF DESCRIPTION OF THE DRAWINGS

FIG. 1 is a top view of a keyboard in accordance with the present invention;

FIG. 2 is a top view of a keyboard in accordance with a first embodiment of the invention with the key caps and key covers removed;

FIG. 3a and 3b are bottom view of key caps in accordance with the first embodiment of the invention;

FIG. 4 is a bottom view of a key cover in accordance with both embodiments of the present invention;

FIG. 5 is an exploded view of a second embodiment of a switch and key cap in accordance with the present invention;

FIG. 7 is a top view of a tool for removing key caps and key covers from their associated switches in accordance with the present invention. Referring first to FIG. 1, there is shown a typical keyboard arrangement 1 in accordance with the present invention with active keys of standard 5 and oversized 7 variety as well as key covers 21 at those positions which do not provide active functions. The keyboard 1 includes a standard space bar 3 with letter keys 5 in a standard typewriter arrangement and left and right oversized shift keys 7 and 9 respectively. It can be seen that the shift keys 7 and 9 are oversized in that they span slightly in excess of two switch distances and are in fact disposed over two or more switch positions. This is also true of the control key 11, tab key 13 and enter key 15. The enter key is somewhat L-shaped and spans two switch positions, each on a different row as compared with the shift control and tab keys which are disposed over plural switches on the same row. As can be seen, all key positions in the keyboard, whether provided with a keycover or an active key, are in an x-y matrix arrangement. There are, in fact, 144 possible key positions shown on the keyboard of FIG. 1. The keyboard surface is curved as is evident from the curvature shown at 23 at the surface of the housing, all functional keys 5 through 15 having the same curvature as the housing surface at 23 to provide universal interchangeability of all keys on the keyboard.

Figure 6:
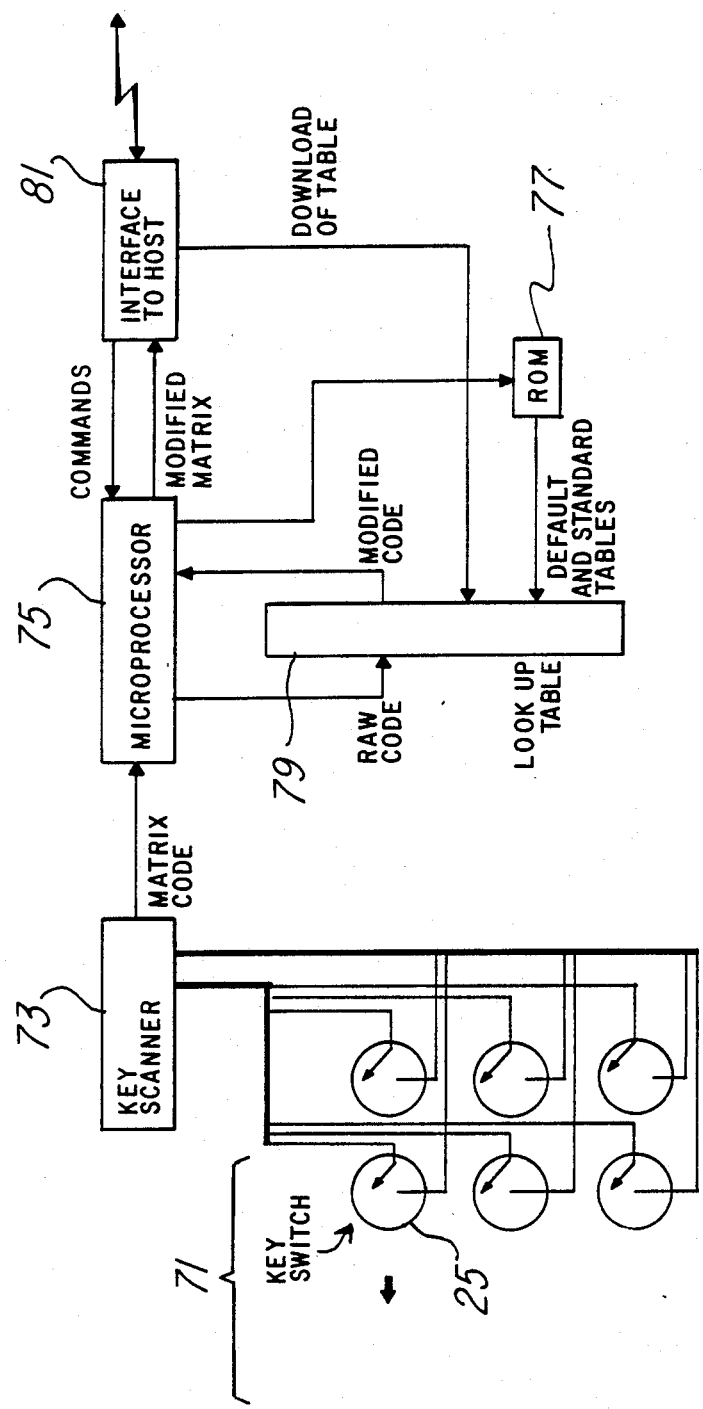
FIG. 6 is a functional diagram of electronic circuit utilized for reconfiguring the key matrix in accordance with the present invention.

Each of the key positions as shown in FIG. 1 includes one or more switch members 25 as shown in FIG. 2 into which an appropriate key is secured. In this manner, in the event an active key 5 to 15 is secured to the switch, the pressing of the key will cause the switch to be operated and provide a signal indicative that particular switch in a matrix arrangement has been operated. Each of the switch positions in the matrix arrangement has a particular address designation whereby, when the switch is operated, the address designation is fed to electronics (which will be explained hereinbelow), the electronics providing a table to indicate the function which that particular matrix position is designed to designate. In addition to active keys 5 to 15, key covers 21 can also be positioned over a particular switch 25. Key covers are designed to be placed over switches which are in locations which are not to be utilized for functions. Accordingly, key covers 21 are not designed to be depressed to operate a switch and are positioned so that the top surface thereof is approximately at the same level as the keyboard housing as shown in FIG. 2 whereas active keys 5 to 15 are positioned substantially above the top surface of the keyboard housing. In addition, in the event a particular switch is to be inactive, not only can a key cover 21 be placed thereover but, in addition, the electronics can be properly programmed to provide a "no key" or appropriate other signal of this type in the event that particular key location on the matrix is being scanned. This provides a double insurance against improper operation of an unused key position.

Referring now to FIG. 2, there is shown a first embodiment of a keyboard in accordance with the present invention with all of the key caps and key covers removed. As can be seen, the keyboard includes a baseplate 29 mounted in the keyboard housing and including a plurality of switches 25 arranged in x-y matrix arrangement except for those switch positions which encompass the standard typewriter keys which are in a somewhat staggered arrangement to accommodate the shape of the hand as is standard in typewriters for the United States market. It can further be seen that switch 27 is removed from other switches on its row. This is to permit the space bar to be attached to switch 27 at only one switch position since it is not intended that the space accommodating the space bar be used for any other purpose and this space is therefore dedicated for a single function.

Each of the switches 25 includes a base portion 31 which is of square shape and secured to the baseplate 29. A stem portion 33 is lockingly mounted in the base portion 31, is reciprocable therein and is normally biased to extend out of the base portion. Movement of the stem portion 33 into the base portion 31 and therefore toward the baseplate 29 will cause the switch (not shown) to be closed and operate the electronics within the keyboard to indicate which switch has been operated. It can therefore be seen that operation of a key 5 to 15 or space bar 3 of FIG. 1 will cause reciprocation of the stem portion 33 and closure of the associated switch 25.

Referring now to FIGS. 3a and 3b, there are shown an enlarged key 7 (FIG. 3a) and a standard key 5 (FIG. 3b) for use in the embodiment of FIG. 2. As can be seen from the underside of each of the keys, there are provide four resilient extensions or fingers 35, 37, 39 and 41, these fingers being identical in each of the keys 5 and 7. The fingers 35, 37 and 39 form essentially three sides of a rectangular parallelepiped designed to just fit into the aperture 30 of the stem portion 33 with the finger 41 extending outwardly slightly beyond the aperture 30 so that the key member can be frictionally secured into the aperture due to the resilience of the fingers. It can be seen that each key is secured to only one switch 25. In the case of an oversized key such as key 7, there is provided a member 45 which is positioned to skirt the switch thereunder and not make contact therewith. A torsion bar 43 is also provided in standard and known manner to permit the oversize keys such as key 7 to operate with equal pressure on the switch, regardless of where the key is depressed by the operator. It is therefore apparent that depression of a key secured to a switch will cause reciprocation of the stem with concommitant operation of the switch 25. The stem will then return to its initial position due to the bias thereon.

Referring now to FIG. 4, there is shown the bottom side of the key cover 21 of FIG. 1 for use in conjunction with the embodiment of FIG. 2. The key cover 21 includes four sets of legs 47 which are resilient and designed to form a rectangular parallelepiped of dimension slightly smaller than that of the base 31 of the switch 25. In this way, the key cover 21 can be forced over the base portion 31 and make a frictional connection thereto. As stated above, the key cover is also designed to have an elevation lower than that of the keys so that the top surface thereof rests at about the surface of the keyboard housing. It can be seen that the key cover will prevent the switch 25 thereunder from being operated.

Referring now to FIG. 5, there is shown a second embodiment of a key switch 51 having a key cap 53 and a base member 55 secured to the baseboard 29 as in FIG. 2. The base member 55 includes a base portion 57 secured to the baseboard 29 and a cylindrically shaped hollow stem portion 59 integral with the base portion 57. A vertical groove 67 is formed on the interior surface of the hollow stem 69 for receiving a key cap as will be described hereinbelow. The key cap 53 includes a top portion 63 and a stem portion 61, the stem portion including an outwardly extending resilient finger 65. The key cap 53 is disposed in the hollow stem 69 with the finger 65 disposed in the groove 67 so that the key cap will reciprocate vertically in the groove 67 but will be incapable of rotation therein. The key cap 53 is normally biased in its upward position whereby, after depression thereof, it will return to its vertical position. When the key cap 53 is depressed, it actuates a switch beneath the baseboard 29 (not shown) in standard manner to indicate that the key at that location has been operated. The key cover for this embodiment is preferably the same as that described above in connection with the first embodiment.

Referring now to FIG. 6, there is shown the electronic circuit in schematic form for configuring the keyboard of FIGS. 1 and 2 as described hereinabove. The electronics can be disposed either within the keyboard housing 25 itself or in a host computer. Preferrably, the electronics will be within the keyboard housing. The circuits includes a keyboard switch matrix 71 which is a matrix composed of all the switches 25 in all of the switch positions of the keyboard as shown in FIG. 2. The keyboard switch matrix 71 is coupled to a microprocessor unit 75 which includes a ROM 77 as either a part thereof or as an external circuit coupled thereto via a key scanner 73 which scans through each of the key positions of the matrix. The ROM is provided with a copy of a default for the lookup table 79 which includes a default program for configuring the keyboard switches 25 in the event no specific keyboard configuration is provided and programs for other known keyboard layouts which may be desired. This permits the configuration of a desired keyboard arrangement without manually changing each key designation individually such as the IBM PC, the TI Professional or the like. These arrangements can also be selected under control of the microprocessor 75 whereby the function of each matrix position of the keyboard is designated. Also provided is a RAM lookup table 79 which is a part of the microprocessor 75 or which could be a separate external circuit and wherein is stored the arrangement of the keyboard switch matrix at the present time. Furthermore, in conjunction with the lookup table 79, the keyboard switch matrix can be rearranged on a switch by switch basis. A computer program is provided for the list which displays the present keyboard arrangement whereby changes in the switch arrangement can be performed under control the microprocessor 75 which are stored in the RAM and are displayed on the display. The circuitry of FIG. 6 can be disposed within the keyboard itself as shown in FIG. 6 with a connection to the host computer 81, can be in the host computer itself, or can be partially in the keyboard and partially in the host computer whereby key switch settings can be dictated by the host computer itself via the interface 81.

Referring now to FIG. 7, there is shown a key removal tool for removing key caps from the remainder of the switch mechanism to assist in reconfiguration of the keyboard. As can be seen from FIG. 1, there is very little space between keys and, as can be seen from FIGS. 3 and 5, it is necessary that a substantial vertical force (normal to the axis of the switch) be applied to each key cap to force it out of the stem in which it is locked (frictionally in FIG. 3 and in the groove in FIG. 5). It is also apparent that if the lateral force applied to the key cap during removal is too great, the key, the switch stem or both can be damaged. In order to provide for key cap removal, the tool as shown in FIG. 7 has been provided which meets with all of the above noted criteria. The tool 83 is in the shape of a rectangular parallelepiped 85 having one relatively long dimension, a second dimension about the same or preferably slightly less than the width dimension of a regular key cap 5 and a third dimension which is small relative to the other two but sufficient to provide sufficient strength to the tool for the purpose intended. One end portion 87 can be squared or of other shape as shown, this shape not being critical. At said end portion 87 is a triangular extension 89 of reduced width relative to the small dimension of the rectangular parallelepiped 85 and of sufficiently small dimension to be able to fit between key covers. The other end 91 of the tool 83 is in the shape of a "V" extending the full dimension of the side of the tool and of sufficiently small dimension to be able to fit between key caps.

In operation, the short side of the "V" surface of tool portion 91 is inserted under the edge of surface 92 of a key cap and the tool is either lifted or rotated (depending on embodiment) to remove the key cap. Tool portion 89 is inserted at the corner of a key cover slated for removal and rotated to the underside to pry off the key cover. In each case, the tool provides substantially vertical force to the key cap or key cover sufficient to overcome the restraining force. This will allow the key cap or key cover to be removed from the switch associated therewith in simple manner.

It can be seen that there has been described a universal keyboard which can be reconfigured to provide a host of different keyboard configurations, either by default, via software operation in the keyboard itself or via a host computer or by individual keyboard switch settings by the operator.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A reconfigurable computer keyboard, comprising:
    (a) a baseplate housing having a concave curved upper surface;
    (b) a plurality of electrical switches disposed on the upper surface of said baseplate housing;
    (c) a first plurality of keycaps removably attached to first predetermined ones of said switches, said first predetermined ones of said switches each providing a first predetermined condition, each of said first plurality of keycaps having upper surfaces having substantially the same curvature, and at least some of said first plurality of keycaps having indicia on the upper surfaces thereof to indicate one of alphanumeric or keyboard operations to be performed by pressing that key;
    (d) a second plurality of keycaps disposed over the remaining ones of said plurality of switches, said remaining switches each providing a second predetermined condition different from said first predetermined condition to prevent actuation thereof;
    (e) a control store containing a mapping of said first predetermined ones of said electrical switches to one of alphanumeric or keyboard functions;
    (f) a controller for scanning said plurality of switches to determine if at least one of said first predetermined ones of said switches is currently actuated, said controller responsive to said scanning for consulting said control store when a switch actuation is detected, and responsive to said control store for communicating a code to a host indicating the one of the corresponding alphanumeric character or function of such actuated switch, said controller further including means responsive to predetermined operation of one of said host and said plurality of switches to write new mapping information into said control store;
    (g) whereby a user can move said first plurality of keycaps and said second plurality of keycaps to any desired position and update said writable control store to reflect the new positions thereof.

2. The keyboard of claim 1, wherein a first subset of said plurality of switches is arranged in rows offset in the pattern of a standard typewriter keyboard and wherein a second subset of said plurality of switches is arranged in a regular rectangular matrix.

3. The keyboard of claim 1, wherein the upper surface of each of said second plurality of keycaps, when placed over one of said remaining switches, is disposed closer to said curved baseplate than the upper surface of each of said first plurality of keycaps when attached to one of said first plurality of switches.

4. The keyboard of claim 3, wherein the upper surface of each of adjacently disposed ones of said second plurality of keycaps is closely adjacent to and provides the appearance of a continuous surface located substantially along the surface of said curved baseplate.

5. The keyboard of claim 1, wherein said controller is further responsive to predetermined new mapping information received in said control store from said host to write new mapping information in said control store.

6. A reconfigurable computer keyboard system, comprising:
    (a) a plurality of electrical switches;
    (b) a first plurality of keycaps removably attached to first predetermined ones of said plurality of electrical switches, said first predetermined ones of said switches each providing a first predetermined condition;
    (c) a second plurality of keycaps disposed over the remaining ones of said plurality of electrical switches, said remaining switches each providing a second predetermined condition different from said first predetermined condition to prevent actuation of each of said remaining switches;
    (d) a control store containing a mapping of said first predetermined ones of said electrical switches to one of alphanumeric or keyboard functions; and
    (e) a controller for scanning said plurality of electrical switches to determine if at least one of said first predetermined ones of said switches is currently actuated, said controller responsive to said scanning for consulting said control store when a switch actuation is detected, and responsive to said control store for communicating a code to a host indicating the one of the corresponding alphanumeric character or function of such actuated switch, said controller further including means responsive to predetermined operation of one of said host and said plurality of electrical switches to write new mapping information into said control store;
    (f) whereby a user can move said keycaps to any desired position and update said writable control store to reflect the new positions thereof.

7. A reconfigurable computer keyboard system, comprising:
    (a) a plurality of electrical switches, first predetermined ones of said plurality of electrical switches each providing a first predetermined condition and the remaining ones of said plurality of electrical switches each providing a second predetermined condition different from said first predetermined condition;
    (b) a control store containing a mapping of said first predetermined ones of said electrical switches to one of alphanumeric or keyboard functions; and
    (c) a controller for scanning said plurality of electrical switches to determine if at least one of said first predetermined ones of said switches is currently actuated, said controller responsive to said scanning for communicating with said control store when a switch actuation is detected and responsive to said communication with said control store for providing a code to a host indicating the alphanumeric character or function corresponding to such actuated switch, said controller further including means responsive to predetermined operation of one of said host and said plurality of electrical switches to write new mapping information into said control store;
    (d) whereby a user can move keycaps to any desired position and update said writable control store to reflect the new positions thereof.

* * * * *